United States Patent [19]

Orgeret

[11] 4,323,720
[45] Apr. 6, 1982

[54] SET OF BARS FOR A HIGH-TENSION UNIT

[75] Inventor: Lucien Orgeret, Lyons, France

[73] Assignee: Societe Anonyme dite: Delle-Alsthom, Villeurbanne, France

[21] Appl. No.: 140,922

[22] Filed: Apr. 16, 1980

[30] Foreign Application Priority Data

Apr. 23, 1979 [FR] France .................. 79 10223

[51] Int. Cl.³ .................. H02G 5/06; H02G 15/24
[52] U.S. Cl. .................. 174/21 JS; 174/216; 285/325
[58] Field of Search .............. 174/21 R, 21 JS, 21 JR, 174/21 JC, 21 C, 21 CA, 22 C; 285/31, 184, 325, 133 R

[56] References Cited

U.S. PATENT DOCUMENTS 3,585,271  6/1971  Reynolds et al. .............. 174/21 CA
3,646,245  2/1972  Swerdlow .................. 174/21 JS
4,089,455  5/1978  Fellers .

FOREIGN PATENT DOCUMENTS 2514161  10/1976  Fed. Rep. of Germany .... 174/21 C
732174   6/1932   France .
1215105  11/1959  France .
2013150  5/1972   France .
2282776  3/1976   France .
662976   5/1979   U.S.S.R. .................. 174/21 C Primary Examiner—Roy N. Envall, Jr.
Assistant Examiner—D. A. Tone
Attorney, Agent, or Firm—Sughrue, Mion, Zinn, Macpeak and Seas

[57] ABSTRACT

The invention relates to a set of metal-clad bars for a high-tension unit. A metal casing contains an insulating gas and is formed by cylindrical lengths whose ends have flanges to connect them to the adjacent lengths. The set of bars is characterized in that said lengths are disposed in a longitudinal alignment, and at least one of the connection flanges of a length (12) is disposed in a plane which is inclined with respect to the longitudinal axis of the casing (1) and concurrent with the plane of the flange (22) situated at the other end of said length.

6 Claims, 6 Drawing Figures ion flanges, the connection flanges are in the form of circular rings.

SET OF BARS FOR A HIGH-TENSION UNIT

The invention relates to a set of bars for a metal-clad high-tension unit or for any straight connection such as, for example, cables with gas insulation.

BACKGROUND TO THE INVENTION

To reduce the bulk of high-tension units while ensuring safety, the electrical apparatus is often installed in metal casings filled with an insulating gas at low pressure, e.g. sulphur hexafluoride or a mixture of sulphur hexafluoride with nitrogen or any other gas having good dielectric properties. This is particularly true of sets of bars whose components are disposed longitudinally end to end and coaxially in metal casings which are generally radially symmetrical so as to obtain uniform electric fields. When the unit is installed in situ, the various components are installed in order, one after another. However, when a given component is to be handled, it is important to be able to remove only the component concerned without being obliged to remove the neighbouring components. Now, although this is relatively easy for parallel-connected components, it is not so easy when said components are disposed in series, end to end, as in the case of sets of bars.

OBJECT OF THE INVENTION

The invention aims to provide a disposition which allows a component of a set of bars in a protective casing to be removed without requiring the adjacent components to be removed and to be installed subsequently in the same conditions.

SUMMARY OF THE INVENTION

The invention provides a set of bars for a metal-clad high-tension unit containing an insulating gas, said cladding being formed by a casing of cylindrical lengths disposed in a longitudinal alignment, wherein between said lengths of casing there is an intermediate connection length which can be dismantled and has on at least one of its ends a connection flange disposed in a plane which is inclined with respect to the longitudinal axis of the casing and co-operates with a connection flange of the adjacent length and wherein an intermediate length of bar is disposed inside said connection length, the ends of said intermediate length of bar including joining components which are detachably connected to the ends of the bars of the adjacent lengths of casing, said joining components being level with the joint between the flanges of the casing.

According to one feature, one end of the intermediate length of bar has a flat surface assembled with a flat surface of the adjacent length of bar and the other end of the intermediate length of bar has a ring of contact studs which cooperate with the end of the adjacent length of the set of bars.

According to another feature, at the point where the inclined connection flanges of two adjacent lengths meet, the casing is radially symmetrical and has a spheroidal bead and seen perpendicularly to their plane of inclination, the connection flanges are in the form of circular rings.

According to yet another feature, the inclined connection flanges between two adjacent lengths are provided with means to change their transverse position with a view to allowing distance between the lengths which are to be connected together to be adjusted.

The angle of inclination of the flanges may advantageously be 45°.

The casing may include two short sections with an inclined connection flange between them, the other ends of said sections having flanges which are perpendicular to the longitudinal alignment and are connected to long lengths.

BRIEF DESCRIPTION OF THE DRAWINGS

Embodiments of the invention are described by way of example with reference to the accompanying drawings in which.

DETAILED DESCRIPTION

Figure 1:
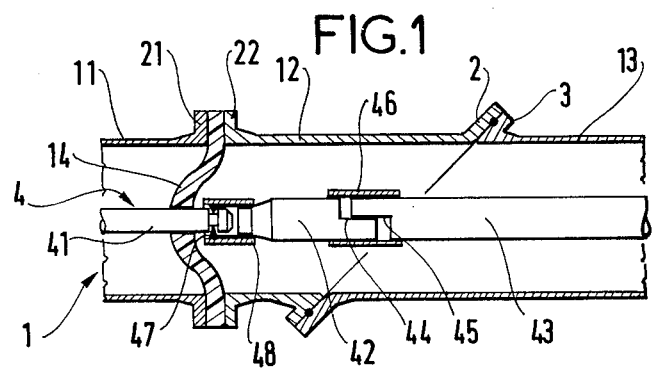
FIG. 1 is a longitudinal cross-section of a fraction of a set of bars in accordance with the invention.
Figure 2:
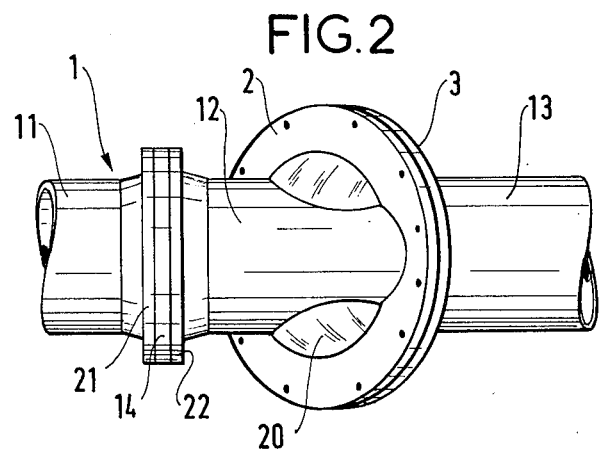
FIG. 2 is a partial plan of the set of bars in accordance with FIG. 1.

In the figures, 1 is the assembly formed by a cylindrical metal casing of a metal-clad high-tension unit filled with an insulating gas such as sulphur hexafluoride. The casing 1 includes a central connection length 12 disposed longitudinally in series between two adjacent lengths 11 and 13, the lengths being constituted by sleeves with connection flanges on their ends.

The end of the length 11 therefore has a flange 21 which is perpendicular to the axis of the casing 1 and is clamped (by means not shown) onto the perpendicular end flange 22 of the length 12. A conical insulator 14 is interposed between the flanges 21 and 22. The end of the length 13 has an inclined flange 3 which is connected to a flange 2 which is also inclined and constitutes the other end of the length 12.

Line bars 4 constituted by three cylindrical lengths 41, 42 and 43 are disposed on the axis of the casing 1, the length 41 passing through the conical insulator 14. The adjacent ends of the lengths 42 and 43 include flat surfaces 44 and 45 which allow them to be assembled by means of transverse pins, not shown, the assembly thereby formed being disposed in a sleeve 46 which protects them against glow discharge. The end of the length 42 adjacent to the end of the length 41 includes a ring of contact studs 47 which connect the length 42 to the length 41 inside a protective bushing 48.

Figure 4:
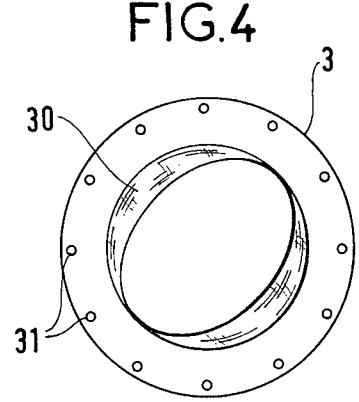
FIG. 4 is an end view of the length of the set of bars illustrated in FIG. 3 looking perpendicularly to the plane of the connection flanges.

In accordance with the invention, the flanges 2 and 3 of the lengths of casing 12 and 13 are inclined with respect to the axis of the casing. Here, the inclination is at 45 degrees but it could lie between 45 and 60 degrees. Further, these flanges are disposed level, that is, the plane of contact between the flanges intersects with a connection between two lengths 42 and 43 of the line bars 4. Also, level with the flanges 2 and 3, there are spherical beads 20 and 30 on the sides of the adjacent lengths 12 and 13 of the casing 1. This provides greater resistance to the pressure inside the casing 1 and traps any fine particles inside the casing. Such particles cannot be placed in suspension due to the electric field which is made virtually zero in the spherical portions. When observed from a position perpendicular to the plane of their inclination, the flanges 2 and 3 appear as circular rings as shown in FIG. 4. The connection surfaces of the spherical beads 20 and 30 with the inclined flanges 2 and 3 and the lengths 12 and 13 have rounded portions which are illustrated in FIG. 6.

Figure 3:
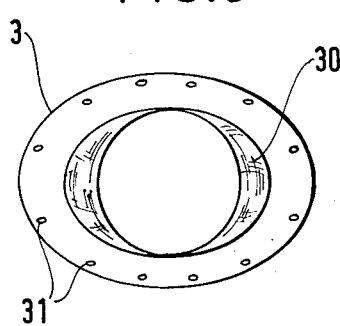
FIG. 3 is an end view of a length of bars in accordance with the invention illustrated in FIG. 1.

The inclined flanges 2 and 3 are connected together by means of threaded rods or bolts, not shown, but which pass through holes in their peripheries such as the holes illustrated at 31 in FIGS. 3 and 4. However, the inclined flanges 2 and 3 are provided with means to vary their positions so as to allow the lengths which are to be connected together to be made longer or shorter as required.

Figure 5:
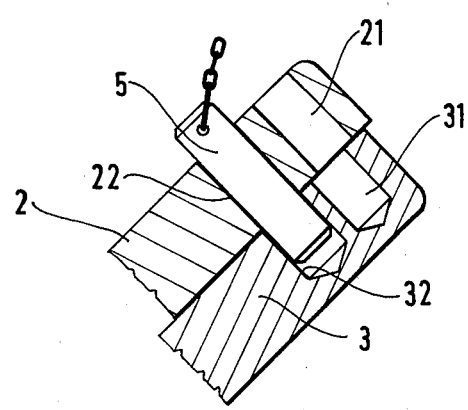
FIG. 5 is a detailed large-scale view showing a means of adjusting two inclined flanges.

In FIG. 5, the adjacent holes 21 and 31 in the flanges 2 and 3 which are to be connected together e.g. by means of bolts, not shown, are staggered by means of auxiliary holes 22 and 32 in which pins 5 are inserted.

Figure 6:
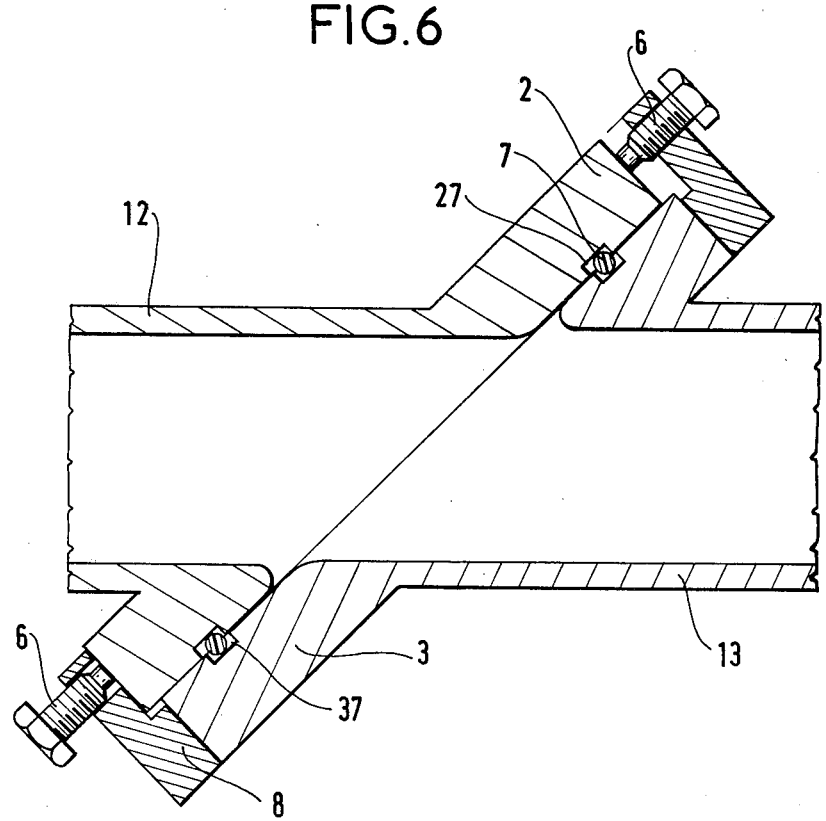
FIG. 6 is a detailed large-scale view showing another means of adjusting two inclined flanges.

In FIG. 6, relative movement of the flanges 2 and 3 with respect to each other is provided by operating lateral stop screws 6 which are supported by a ring 8 fixed to the flange 3.

Sealing between the flanges is provided conventionally by seals such as 7 which are interposed between two adjacent grooves 27 and 37 in the flanges.

The set of line bars is dismantled as follows. When the inside of the casing 1 is drained, the inclined flanges 2 and 3 are released then the length 12 is slid laterally. This releases it and allows a suitable tool to be inserted to dismantle the length of line bar 42 and to remove the length 12, since the available space between the lengths of casing 11 and 13 allow complete removal of the section of casing 12.

Assembly is effected in the reverse order. Therefore, the two inclined flanges 2 and 3 are adjusted, taking into account the possible adjustment by the pins or the screws before the collars are tightened.

Such a set of line bars makes it possible to dismantle only the length concerned and to adjust the length of the casing of the set of line bars continuously or discontinuously.

Further, it may be an advantage to insert two very short lengths between two long lengths of casing which have perpendicular flanges, said short lengths each having an end with a perpendicular flange assembled at the adjacent end of a long length, then to assemble together the adjacent inclined ends of said short lengths.

The possibilities when dismantling the sets of line bars placed inside the casing are thereby considerably increased.

I claim:

1. A metal-clad high-tension unit containing an insulating gas, cladding formed by a casing of cylindrical casing lengths disposed in longitudinal alignment, bars within said casing lengths, a dismantleable intermediate connection casing length interposed between said lengths of casing and having on at least one of its ends a connection flange disposed in a plane which is inclined with respect to the longitudinal axis of the casing and which is aligned with a connection flange of the adjacent length, an intermediate length of bar being disposed inside said connection casing length, the ends of said intermediate length of bar including joining components which are detachably connected to the ends of the bars of the adjacent lengths of casing and said joining components being joined at the plane of contact between the flanges of the casing lengths; whereby, said intermediate connection casing length may be laterally removed without dismantling of the cylindrical casing length or the bars within said casing length.

2. A high-tension unit according to claim 1, wherein one end of the intermediate length of bar has a flat surface and is assembled to a flat surface of the adjacent length of bar and the other end of the intermediate length of bar having a ring of contact studs which connects with the end of the adjacent length of the set of bars.

3. A high-tension unit according to claim 1, wherein at the area where inclined connection flanges of two adjacent lengths meet, the casing is radially symmetrical and has a spheroidal bead.

4. A high-tension unit according to claim 3, wherein seen perpendicularly to their plane of inclination, the connection flanges are in the form of circular rings.

5. A high-tension unit according to claim 1, wherein the inclined connection flanges between two adjacent casing lengths include means for changing their transverse position to allow the distance between the lengths which are to be connected together to be adjusted.

6. A high-tension unit according to claim 1, wherein the angle of inclination of the flanges is 45°.

* * * * *